March 11, 1958 — A. L. OLSON — 2,826,129
TRACTOR CARRIED ROTARY CULTIVATOR OR MOWER
FOR CUTTING AROUND POSTS, ETC
Filed Sept. 13, 1955 — 5 Sheets-Sheet 1
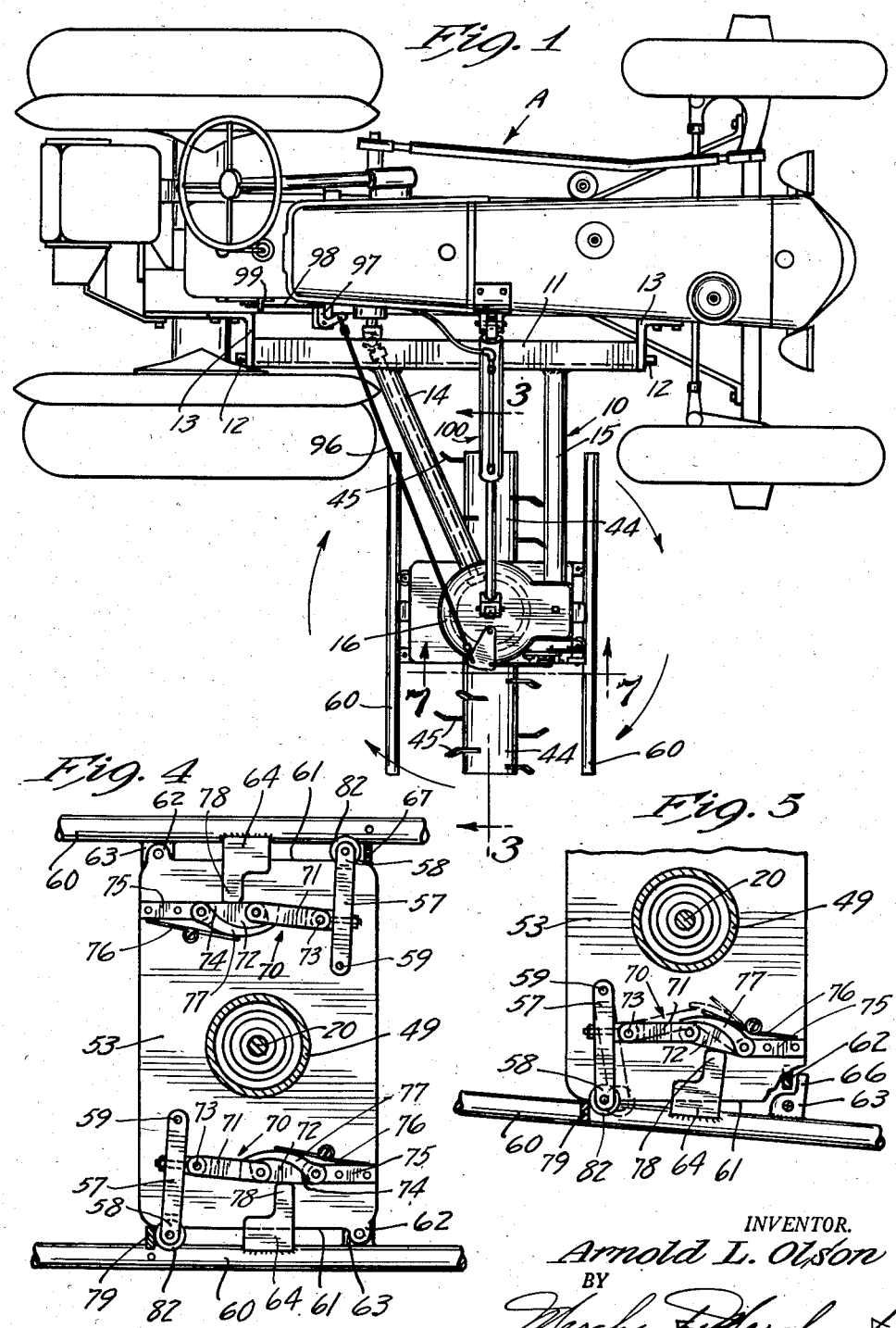
INVENTOR.
Arnold L. Olson
BY
Merchant & Merchant
ATTORNEYS March 11, 1958
A. L. OLSON
2,826,129
TRACTOR CARRIED ROTARY CULTIVATOR OR MOWER
FOR CUTTING AROUND POSTS, ETC
Filed Sept. 13, 1955
5 Sheets-Sheet 2
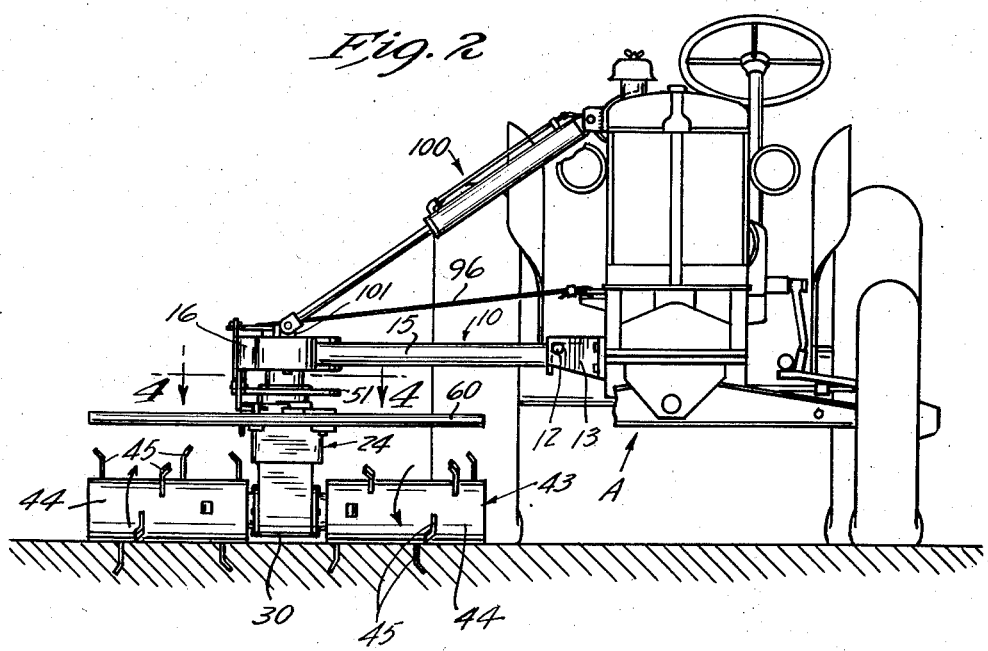
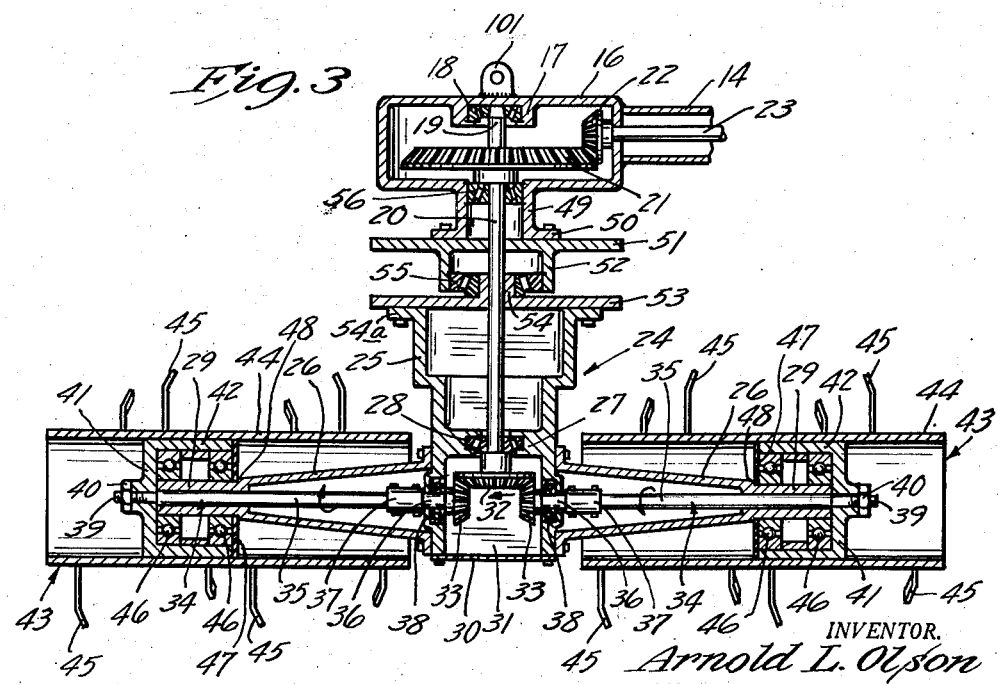
INVENTOR.
Arnold L. Olson
BY
Merchant & Merchant
ATTORNEYS

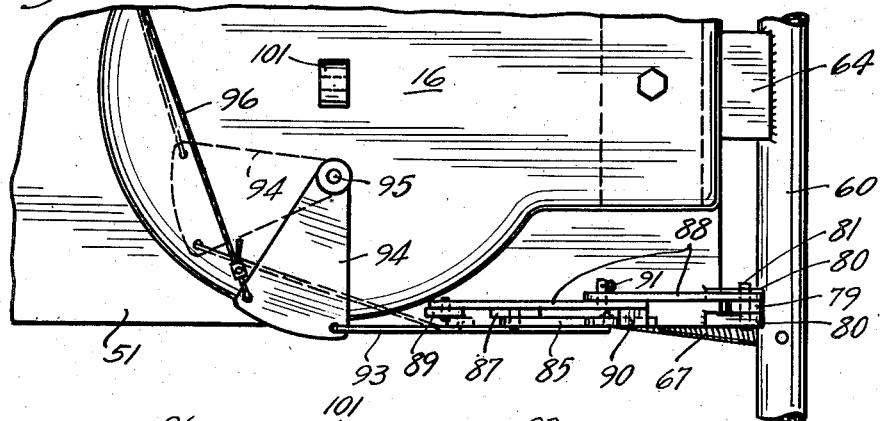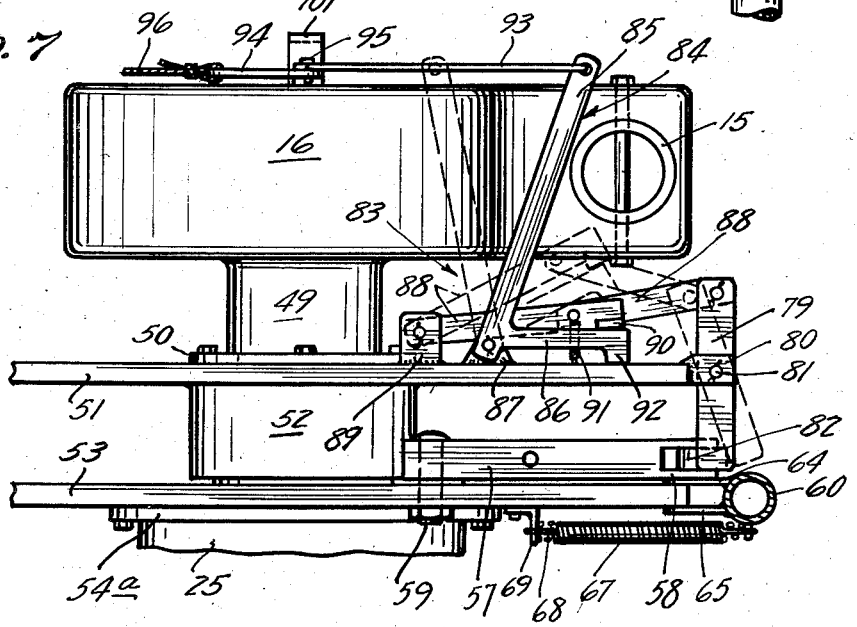

March 11, 1958     A. L. OLSON     2,826,129
TRACTOR CARRIED ROTARY CULTIVATOR OR MOWER
FOR CUTTING AROUND POSTS, ETC
Filed Sept. 13, 1955     5 Sheets-Sheet 4
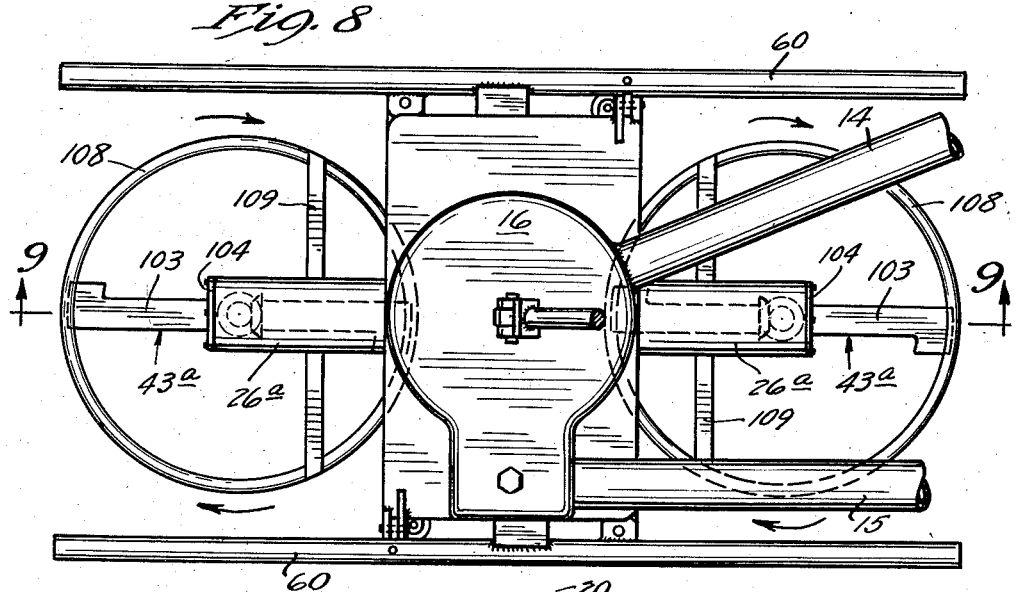
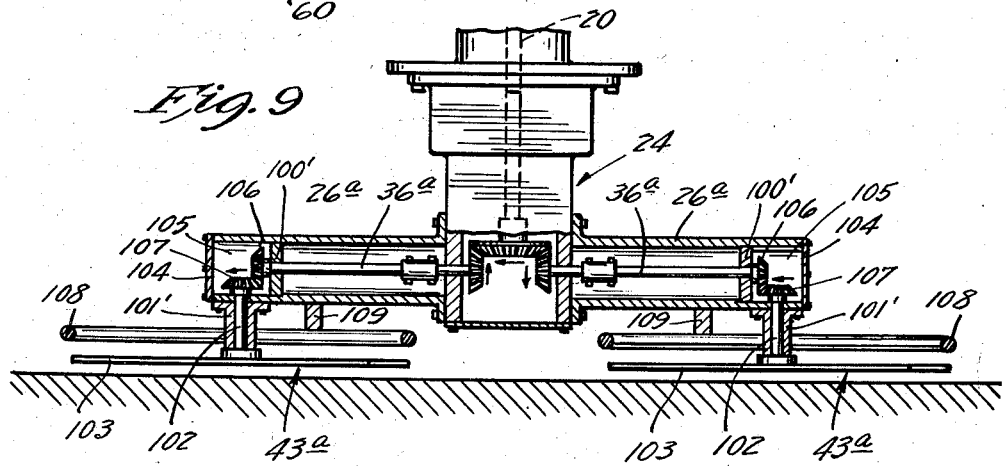
INVENTOR.
Arnold L. Olson
BY
Merchant & Merchant
ATTORNEYS

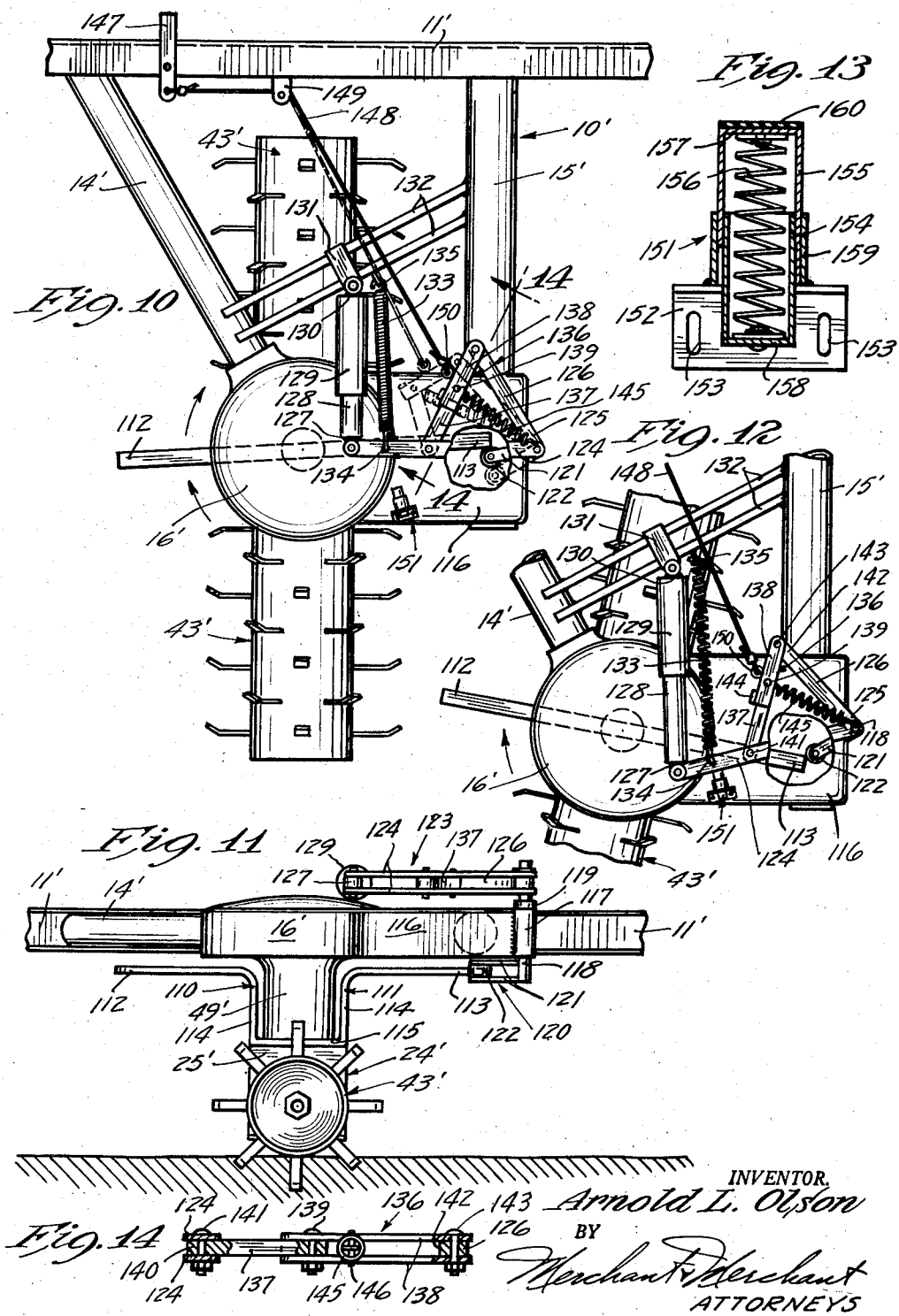

United States Patent Office 2,826,129
Patented Mar. 11, 1958

2,826,129

TRACTOR CARRIED ROTARY CULTIVATOR OR MOWER FOR CUTTING AROUND POSTS, ETC.

Arnold L. Olson, Wahpeton, N. Dak.

Application September 13, 1955, Serial No. 534,015

20 Claims. (Cl. 97—40)

My invention relates broadly to a novel and improved agricultural implement. In particular, it relates to a novel and improved mowing and/or cultivating implement adapted to be connected to and carried by a tractor.

The primary object of my invention is to provide a novel and improved agricultural implement which when attached to a tractor or the like is adapted to cultivate or mow completely around trees, shrubs, fence posts, and like obstructions, while driving past the obstruction and without stopping or interruption. My invention is adapted to eliminate all hand cultivating or trimming around trees, shrubs, posts and the like.

Another object of my invention is to provide a device of the class described which is simply and effectively operative, and simple and rugged in construction.

Another object of my invention is to provide an agricultural implement adapted to be connected to and carried by a tractor or the like and which may be provided with rotary cultivating or mowing implement heads wherein the rotary heads of the implement form a part of a lower unit which tends to rotate about a vertical axis upon rotation of the heads; the lower unit is locked against said planetary rotation about said vertical axis during normal straight running, however when a tree, post or a like obstruction is approached, the lower unit is released for planetary rotation and the rotating implement heads revolve together around the tree or obstruction cultivating or trimming thereabout, without ever having stopped or slowed the forward movement of the tractor, and the lower unit is then again relocked automatically against planetary rotation.

Another object of my invention is to provide in a device of the class described, means for automatically releasing the lower unit for planetary rotation when a tree, post or a like obstruction is in the path of the implement.

Still another object of my invention is to provide in a device of the class described, control means which will automatically trip the latching mechanism which locks the lower unit against planetary rotation, if an obstruction, such as a rock or the like, is met by one of the rotating heads and which puts an undue load on the lower unit, thereby effecting rotation of the lower unit and heads and avoiding the obstruction.

A further object of my invention is to provide in a device of the class described, means for absorbing the shock of stopping planetary rotation of the lower unit and relocking it against such rotation.

These and other objects and advantages of my invention will become apparent from the following specification and claims, references being had to the accompanying drawings wherein:

Fig. 1 is a view in top plan of my invention showing it attached to a tractor in normal operative position;

Fig. 2 is a view in front elevation of the structure shown in Fig. 1;

Fig. 3 is an enlarged view in vertical section taken substantially on the line 3—3 of Fig. 1;

Fig. 4 is an enlarged fragmentary view partly in horizontal section and partly in plan taken substantially on the line 4—4 of Fig. 2;

Fig. 5 is a fragmentary view of a part of Fig. 4 showing some of the parts thereof in different positions;

Fig. 6 is an enlarged fragmentary view in top plan of a portion of Fig. 1;

Fig. 7 is an enlarged fragmentary view in side elevation taken substantially on the line 7—7 of Fig. 1;

Fig. 8 is a fragmentary view in top plan of a modification of my invention;

Fig. 9 is a fragmentary view partly in elevation and partly in section taken substantially on the line 9—9 of Fig. 8;

Fig. 10 is a view in top plan, with some parts being broken away, of another modification of my invention;

Fig. 11 is a view in side elevation of the modification of my invention shown in Fig. 10, as viewed substantially on the line 11—11 of Fig. 10;

Fig. 12 is a fragmentary view in top plan of the structure of Fig. 10, showing some of the parts thereof in different positions;

Fig. 13 is an enlarged view partly in top plan and partly in horizontal section of a stop construction shown in Fig. 10; and Fig. 14 is an enlarged detail view partly in elevation and partly in section taken substantially from the line 14—14 of Fig. 10.

Referring more particularly to the drawings, wherein like parts will be indicated by the same numeral, my novel and improved agricultural implement comprises a supporting structure, indicated generally by the numeral 10, which is adapted to be connected to a tractor, indicated in its entirety by the letter A. By the use of the term "tractor" I am broadly referring to any motor-driven wheeled device of any suitable construction adapted for carrying an agricultural implement, and it is not necessary that it have a seat or be of the specific structure shown in Figs. 1 and 2. Reference to an "agricultural" implement herein is not intended to be limited to an implement used in the cultivation, raising or growing of a crop in the limited extent of a harvestable product, but is also intended to include an implement for mowing or trimming grass, weeds, and the like.

Supporting structure 10 includes a supporting bar 11, which is preferably an elongated angle iron as shown having a pair of pintles 12 rigidly anchored thereto, by welding or the like, one at each of its ends in axially aligned relationship. Suitable brackets 13 are bolted or otherwise rigidly anchored to the tractor A and have laterally outwardly projecting portions which journal pintles 12 and mount supporting bar 11 onto tractor A in a generally horizontal position generally parallel to the path of straight-line movement of tractor A for pivotally swinging movements about the generally horizontal axis of aligned pintles 12. Tubular members 14 and 15 of supporting structure 10 are each rigidly anchored at one end by welding or the like to supporting bar 11 and they project laterally outwardly therefrom, the latter generally perpendicular to supporting bar 11 and the former generally diagonally inclined toward the latter, to be rigidly connected at their opposite ends to a housing 16, which is at the free end of supporting structure 10 and disposed laterally outwardly beyond the limits of tractor A.

Housing 16 has an annular inwardly projecting boss 17 which supports a bearing 18 for the uppermost end 19 of a normally vertically disposed depending shaft 20. Housing 16 encloses bevel gears 21 and 22, the former being connected to shaft 20 and the latter being connected to the end of the drive shaft 23. Drive shaft 23 extends through tubular member 14 and is adapted to be connected to and driven from the power takeoff of tractor A. Drive shaft 23 and bevel gears 21 and 22 drive depending shaft 20 about a normally vertically disposed axis.

I provide arm structure, indicated generally by the numeral 24, which comprises a hub 25 and a pair of normally horizontally disposed arms 26. Preferably hub 25 has a web portion 27 housing a bearing 28, which journals hub 25 on depending shaft 20 for rotation with respect thereto about the normal vertical axis of rotation of shaft 20. Arms 26 are rigidly anchored to hub 25 by bolts or the like and project radially outwardly therefrom in diametrically opposed relationship. Each of the arms 26, in the embodiment of my invention shown in Fig. 3, is hollow and tapers to a cylindrical tip portion 29. Hub portion 25 is generally tube-like with web portion 27 thereof disposed intermediate its ends. A removable bottom cover plate 30 is bolted by screws or the like to the open bottom end of hub portion 25 to define therewith, between web portion 27 and cover plate 30, an enclosed gear housing chamber 31. Gear housing chamber 31 contains a bevel gear 32, which is rigidly connected to the lower end of depending shaft 20 to be driven thereby, and a pair of oppositely disposed bevel gears 33 meshed with gear 32 to be driven thereby in opposite directions. Each of the gears 33 is connected to a different one of a pair of normally generally horizontally disposed axially aligned shafts 34, which project radially outwardly in diametrically opposite directions from gear housing 31, each through a different one of the arms 26. Each of the shafts 34 comprises sections 35 and 36 having adjacent ends connected by a coupling 37. Sections 36 of shafts 34 are journalled in hub portion 25 by anti-friction bearings, indicated by the numeral 38, and sections 35 of shafts 34 are journalled in cylindrical tip portions 29 of arms 26; whereby, each of the shafts 34 are rotatable within a different one of the arms 26 about a horizontal axis independent of arm structure 24. Each of the shafts 34 terminates at the free radially outwardly disposed ends of sections 35 thereof in a reduced threaded portion 39, which receives a nut 40 for fastening a cup-shaped web member 41 to each of the shafts 34 for rotation therewith. Each of the web members 41 has a generally cylindrical flange portion 42 which is rigidly connected, by welding or the like, to one of a pair of implement heads 43. Implement heads 43 comprise generally elongated tubular structures disposed in axially aligned relationship, and each head 43 encompasses a different one of the arms 26 in concentric relationship with the shaft 34 to which it is connected for rotation through one of the web members 41.

Implement heads 43 might be formed in the nature of the mowing blades or knives of a reel-type lawn mower; however, as specifically shown, they comprise cultivating heads having tubular bodies 44 and a plurality of longitudinally and circumferentially spaced cultivating lugs 45 anchored to the tubular body 44 and projecting radially outwardly therefrom.

Each of the cup-shaped web members 41 supports a pair of axially spaced ball bearings, indicated by the numeral 46, for supporting the implement heads 43 on arms 26 for rotation therewith and for rotation with shafts 34 independent of arm structure 24. Thus, in the embodiment of my invention shown in Figs. 1 through 7, the implement heads 43 are rotatable, each with a different one of the shafts 34, about aligned horizontal axes in opposite directions, as shown by the arrows in Fig. 2 independent of the arm structure 24 and are capable of planetary movement with arm structure 24 about the vertical axis of depending shaft 20.

I provide a pair of annular sealing members 47, one of which is associated with each of the web members 41 at the radially inwardly opening end thereof to seal in the bearings 46. Annular sealing members 47 are held against axial movement by the shoulders 48 between the cylindrical tip portion 29 and the tapered portion of each of the arms 26.

Referring in more detail to certain elements of the specific structure of my invention shown particularly in Fig. 3, housing 16 includes a generally cylindrical normally vertically disposed neck portion 49, which encompasses depending shaft 20 in coaxial relationship, and a radially outwardly projecting normally generally horizontal annular flange 50, which is preferably integral with neck portion 49 at the lower end thereof. Flange 50 is rigidly anchored, by bolts or the like, to a generally rectangular flat supporting member 51, normally horizontally disposed, which has a depending centrally disposed annular boss 52 rigid therewith and preferably formed integrally therewith. A flat supporting member 53 is rigidly connected, by bolts or the like, to a normally generally horizontal radially outwardly projecting annular flange 54A formed at the upwardly opening end of hub portion 25. Supporting member 53 is similar to supporting member 51 and is disposed in vertically downwardly spaced relation therewith, closely adjacent boss 52. Flat supporting member 53 has a central normally upwardly projecting boss or hub 54 rigid therewith and preferably formed integrally therewith. Hub 54 encompasses depending shaft 20 in coaxial relationship radially inwardly disposed with respect to boss 52. Shaft 20 is journalled in hub 54 for rotation with respect thereto and an anti-friction bearing indicated by the numeral 55, between boss 52 and hub 54 journals the latter for rotation with respect to boss 52 about the axis of depending shaft 20, which aids in supporting arm structure 24 for rotation about the axis of depending shaft 20 independent of the rotation of shaft 20 and which provides a very compact and rigid construction. Depending shaft 20 is further supported for rotation with respect to housing 16 by anti-friction bearing 56 in neck portion 49.

The rotation of implement heads 43 in opposite directions tends to rotate arm structure 24 about the axis of depending shaft 20 in the direction of the arrows shown in Fig. 1 due principally to the friction of the implement heads 43 with the work. I provide releasable indexing means for selectively locking arm structure 24 against such rotation.

My indexing means is preferably a spring detent mechanism having cooperating elements carried by relatively movable supporting members 51 and 53, the latter being rigidly connected to arm structure 24 and the former being rigidly connected to supporting structure 10.

Specifically, referring first to Fig. 4, I provide a pair of latching elements 57 which are longitudinally extended arms bifurcated at their ends 58. At their opposite ends, arms or latching elements 57 are pivotally connected by bolts 59, or the like, to generally rectangular flat supporting member 53 to be disposed generally parallel to opposite sides and adjacent oppositely disposed corners thereof, wherein they are circumferentially spaced in a manner subsequently explained. Arms 57 are disposed between supporting members 51 and 53 and pivotally swingable in planes parallel thereto between latching positions and inoperative positions. I provide a pair of rods 60 which are disposed in laterally spaced normally generally parallel relationship to each other and generally perpendicular to arms 57; and each rod 60 is disposed adjacent a different one of the opposite edges 61 of mounting member 53. Mounting member 53 has a pair of outwardly projecting lugs 62 anchored thereto by welding or the like at the two opposite corners thereof which are laterally spaced from arms 57. Each of the rods 60 has an outwardly projecting ear 63 rigidly anchored thereto intermediate its ends, by welding or the like, and each of the ears 63 is pivotally connected to a different one of the lugs 62 by any suitable means. Each of the rods 60 has a pair of spaced parallel lugs 64 and 65 rigidly connected thereto, by welding or the like, to form a guide channel receiving the adjacent edge 61 approximately centrally thereof. Lugs 64 and lugs 65 aid in supporting and guiding rods 60 for the pivotal movement thereof. Each of the ears 63 has a laterally inwardly projecting finger portion 66, which engages a part of the lug 62 to which it is pivotally connected for limiting laterally outwardly swinging movements of its associated rod 60. When each of the fingers 66 is in engagement with its associated lug 62, rods 60 are at their limit of outwardly swinging movement and are in the positions shown in Fig. 4, which will be defined as the inoperative positions of rods 60. As shown in Fig. 4, rods 60 are parallel to edges 61, laterally outwardly spaced therefrom, at their inoperative positions. I provide resilient means comprising a pair of coil compression springs 67, one of which is associated with each of the rods 60 for biasing it to its inoperative position. Referring in particular to Fig. 7, each of the compression springs 67 underlies supporting member 53 laterally spaced from the pivotal axis of its associated rod 60; and specifically springs 67 are adjacent the opposite ends of edges 61 from the pivotal connections of rods 60. Each spring 67 encompasses a supporting rod or pin 68 which is connected at one end to the associated rod 60 and at its opposite end is longitudinally slidable in a depending bracket 69 which is rigidly connected, by any suitable means, to the under side of supporting member 53. Compression springs 67 are disposed generally perpendicular to their associated rods 60; and each of the rods 60 is pivotally swingable from its inoperative position, Fig. 4, against the bias of its associated spring 67, laterally toward supporting member 53 about its pivotal connection thereto, to the position shown in Fig. 5.

A pair of spring biased toggles, indicated generally by the numeral 70, are disposed generally parallel to rods 60 and generally perpendicular to arms 57; and each of the toggles 70 is associated with one of the rods 60 and a different one of the arms 57 to control, in conjunction with its associated rod 60, the movement of its associated arm 57 between its latching position and its inoperative position. Each of the toggles 70 comprises a pair of links 71 and 72 having adjacent ends pivotally connected. The free end 73 of link 71 is pivotally connected to its associated arm 57 intermediate the ends of the latter; and the free end 74 of link 72 is pivotally connected to a supporting boss 75, which is rigidly anchored to the upper side of supporting member 53. One of a pair of torsion springs 76 is associated with each of the toggles 70. Each spring is connected at a looped intermediate portion thereof to supporting member 53 adjacent the pivotal connection of link 72 and boss 75 of its associated toggle 70. One end of each spring 76 engages an arcuate offset portion 77 of the adjacent link 72 and the other end engages the adjacent boss 75; wherein, each spring 77 biases its associated toggle 70 just past dead center, as shown in Fig. 4. At this position link 72 abuts an inwardly projecting finger portion 78 of the adjacent lug 64. Lugs 64 are at their limit of outward movement when the rods 60 are at their inoperative positions, as shown in Fig. 4. Tension springs 76 biasing toggles 70 each against one of the lugs 64, aids compression springs 57 in biasing rods 60 to their inoperative positions. Rods 60 are pivotally swingable from their inoperative positions, each toward the supporting member 53 to actuate its associated toggle 70 and thereby move the associated latching element or arm 57 from its latching position to its inoperative position. This operation will be discussed in more detail subsequently. It will be remembered that arms 57 are connected to arm structure 24 for rotatable movement therewith about the axis of depending shaft 20, and I provide a cooperating latching element 79, see Fig. 7, which is a bar pivotally connected intermediate its ends to lug 80, which is rigidly anchored adjacent one corner of the supporting member 51. Bar or latching element 79 is pivotally swingable about the horizontal axis indicated by the numeral 81 between the full line and dotted line positions shown in Fig. 7. At the full line position of bar 79, it is generally vertically disposed; and its lower end is disposed in the path of travel of the bifurcated ends of arms 57, during the rotational movement of arms 57 with arm structure 24. Each of the bifurcated ends of arms 57 journals a roller 82 which engages the lower end of bar 79, when the latter is in its full line position of Fig. 7, to lock arm structure 24 at an indexed position.

I provide manual control means, indicated generally by the numeral 83 for moving bar 79 to its dotted line position, Fig. 7, to release the latching engagement between bar 79 and one of the arms 57; and thus permit the rotation of arm structure 24 from one index position to the next. Manual control means 83 comprises a generally L-shaped actuating lever 84 which is pivotally connected at the intersection of its arm portions 85 and 86 to upstanding lug 87, which is rigidly anchored by welding or the like to supporting member 51. Arm portion 86 lies adjacent a toggle 88, pivotally connected at one end to the upper end of bar 79 and pivotally connected at its opposite end to lug 89 which is rigidly anchored to mounting member 51 adjacent lug 87. Toggle 88 has an offset portion 90 which overlies the free end of arm portion 86. Toggle 88 is biased just past dead center by a tension spring 91, the full line position shown in Fig. 7, whereat arm portion 86 is generally horizontally disposed with a depending leg 92 thereof, at its free end, in abutment with supporting member 51. It is clear that the pivotal movement of actuating lever 84 moves arm portion 86 thereof generally upwardly to move toggle 88, against the bias of spring 91, and thereby pivotally swing bar 79 so that the lower end thereof is disposed laterally outwardly of the path of movement of latching elements or arms 57. This movement is shown clearly by dotted lines in Fig. 7. To actuate lever 84, I provide a rod 93 extending between the free upper end of arm portion 85 and a pie-shaped plate-like bell crank 94 connected at its apex to housing 16 for pivotally swinging movements about the axis, indicated by the numeral 95. A rope 96 is connected at one end to bell crank 94 and its opposite end is connected to a second bell crank 97, which is actuated by rod 98. Rod 98 is connected for longitudinal movement to the tractor A by a bracket 99; and rod 98 is connected to a handle member or the like disposed within easy reach of the tractor operator so that actuation of said handle member moves rod 98 longitudinally generally rearwardly, which, in turn, moves bell crank 94 to the dotted line position shown in Fig. 6 through the connection thereto by means of bell crank 97 and rope 96; and movement of bell crank 94 to its dotted line position moves actuating lever 84 to its dotted line position through connecting rod 93.

I provide a piston cylinder arrangement, indicated generally by the numeral 100, between tractor A and upstanding lug 101 rigidly anchored to the top of housing 16 to pivotally swing supporting structure 10 from its normally generally horizontal position, about the axis of aligned pintles 12, to an inoperative upwardly projecting position, not shown in the drawings. It is clear that when supporting structure 10 is in its inoperative position, arm structure 24 and implement heads 43 are upwardly raised to inoperative positions; wherein implement heads 43 are no longer in contact with the ground; and my novel and improved agricultural implement may be easily transported by the tractor A to the place where work is to be done. The drawings show the elements of my invention in their normal positions, wherein the implement heads are adapted to perform their cultivating or mowing function.

Referring now to the operation of my invention hereinbefore described, latching elements or arms 57 are normally maintained at their latching positions, each by its associated spring biased toggle 70, and cooperating latching element or bar 79 is normally maintained, by its associated spring biased toggle 88, within the path of travel of the bifurcated ends 58 of arms 57 and the rollers 82 carried thereby; wherein bar 79 is engaged by one of the rollers 82 to lock arm structure 24 against rotation and which defines one indexed position of arm structure 24. This condition is shown in the drawings, and particularly in Figs. 1 and 2; and it should be noted that at this indexed position, the rod 60 which is associated with the arm 57 in latched relationship to bar 79 is disposed forwardly of arm structure 24, and in fact forwardly of all other parts of my novel and improved implement which are disposed laterally outwardly of the limits of tractor A; wherein, this forward rod 60 is in position to be first contacted by any obstacle within the path of my novel and improved implement during forward movements of tractor A. It will also be noted that this forward rod 60 is disposed generally perpendicular to the path of travel of tractor A and is pivotally connected to mounting plate 53 laterally inwardly of the axis of rotation of arm structure 24, and specifically at the laterally inwardly disposed forward corner of supporting member 53. At this indexed position, my agricultural implement is operated for ordinary straight running with arm structure 24 locked against rotation; however, implement heads 43 are rotated independently of arm structure 24 from power takeoff of tractor A for mowing or cultivating, depending upon which type of implement head is used, a generally straight swath. When an obstacle, such as a tree, post or the like is disposed within the path of my agricultural implement, generally centrally with respect thereto, it is engaged by the forward rod 60 laterally outwardly of the pivot axis thereof, which engagement, during forward movements of the tractor A, moves said forward rod 60 from its inoperative position about its pivot axis toward the adjacent edge 61 of supporting member 53 and towards its associated toggle 70; wherein, finger portion 78 of the lug 64 anchored to forward rod 60 actuates the associated toggle 70 to move the latched arm 57 from the latched position shown in Fig. 4 to the full-line position shown in Fig. 5. This actuation of toggle 70 by finger portion 78 past dead center breaks the holding force of toggle 70; wherein, the force, effected by the rotation of implement heads 43 in opposite directions in engagement with the work, tending to rotate arm structure 24 about the axis of depending shaft 20, in the direction indicated by the arrow in Fig. 1, breaks toggle 70 further, to move the latched arm 57 radially inwardly of latching bar 79, with respect to the axis of rotation of arm structure 24, and out of latched engagement therewith to an inoperative position, as shown in dotted lines in Fig. 5. The automatic releasing of the latched engagement of bar 79 and arm 57 permits the rotation of arm structure 24; and after the rotation of the first released arm 57 past bar 79, the former is returned by its associated spring biased toggle 70 to its latched position.

After the automatic releasing of the latched engagement of bar 79 and one of the arms 57, arm structure 24 will rotate until the other arm 57 engages bar 79 in latched engagement, or between two indexed positions. Arms 57 are circumferentially spaced 180° so that arm structure 24 will rotate 180° between two indexed positions. During the rotation of arm structure 24, implement heads 43 rotate therewith 180° about the obstacle which actuated the foremost rod 60 without ever having stopped or slowed down the tractor A. The two implement heads 43 continue their independent rotation during planetary rotation thereof with arm structure 24 so that each, revolving 180° around the obstacles, together cultivate or trim approximately a full 360° thereabout. After rotating about the obstacle, arm structure 24 and implement heads 43 are again locked at an indexed position and are again ready for ordinary straight running. When the latching elements of my indexing means are released to permit rotation of arm srtucture 24 and implement heads 43 through one 180° cycle, the oppositely rotating implement heads 43 cause the arm structure 24 and implement heads 43 to rotate rapidly about the obstacle, which places the other rod 60 in the foremost position ready to automatically release its associated arm 57 from latched engagement with bar 79, and ready for the next obstacle and another cycle of planetary rotation.

I provide the manual control means 83, in addition to the automatic control means comprising rods 60 and toggles 70, in case an obstacle is approached which is not properly positioned to actuate the foremost rod 60; for example, a low bush or post. The operation of manual control means 83 is simply effected by the operator merely pulling and releasing rod 98 by any suitable handle member, which effects the movement of lever 84 to break toggle 88 past dead center and move bar 79 from its full-line position to its dotted line position shown in Fig. 7. This releases the latching elements, bar 79 and one of the arms 57, to effect the 180° cycle of rotation of arm structure 24 and implement heads 43.

Although I have shown a preferred embodiment of my indexing means, and both manual and automatic control therefor, it is clear that there might be many modifications to this; for example, each cycle of rotation of arm structure 24 and implement heads 43 might be 360° instead of 180°, which would require only one latching arm 57 and automatic control means therefor. In addition, although arms 26 of arm structure 24 and implement heads 43 are shown generally perpendicular to the path of movement of tractor A at an indexed position, they might be inclined thereto to eliminate an uncut or uncultivated space between the two implement heads 43.

I provide a modification of my invention, shown in Figs. 8 and 9, which is substantially the same as my invention previously described, but which differs in comprising rotary cultivating or mowing elements. The elements of this modification which are exactly the same as previously described will be given the same numerals in Figs. 8 and 9 as used previously and will not be further referred to; the elements which are substantially the same will be indicated by the same numeral but distinguished by a sub-index letter. The diametrically opposed arms 26a of arm structure 24 are axially aligned generally cylindrical tubes; and each has a web portion 100' transversely disposed therein intermediate its ends and rigidly anchored thereto for journaling shaft sections 36a. I provide a pair of depending bearing bosses; and each is rigidly anchored to a different one of the arms 26a at the free end thereof. Bearing bosses 101' each journal one of a pair of normally vertically disposed stub shafts 102, each of which is rigidly connected at its lower end to an implement head 43a, which comprises a pair of diametrically opposed radially outwardly projecting normally generally horizontal rotary mowing blades 103. The outwardly opening free ends of arms 26a are closed by cover plates 104 to define an enclosed gear housing chamber 105 at each end of the arms 26a; and the upper ends of stub shafts 102 and outer ends of shaft sections 36a terminate in gear housings 105 in meshed bevel gears 106 and 107, the former being rigidly connected to the outer ends of shaft sections 36a for rotation therewith and the latter being rigidly connected to the upper ends of stub shafts 102. The drive means between depending shaft 20 and the mowing blades 103 of implement heads 43a comprising shaft sections 36a, meshed bevel gears 106 and 107, and stub shafts 102 drive implement heads 43a in the same direction, as shown by the arrows in Fig. 8 for a single direction of rotation of depending shaft 20.

Implement heads 43a generally underlie arms 26a and are rotatable about the normally generally vertical axis of stub shafts 102 independent of arm structure 24; and are further carried by arm structure 24 during rotation thereof. I provide a pair of guard rings 108, one associated with each of the rotary implement heads 43a in upwardly spaced parallel axially aligned relationship. Each of the guard rings 108 is rigidly anchored to a different one of the arms 26a by an elongated supporting bar 109. Bars 109 are rigidly anchored to the under side of arms 26a, by welding or the like, and each intersects its associated guard ring 108 in the manner of a chord and is rigidly anchored thereto at such intersections by welding or the like. Although implement heads 43a in the modification of Figs. 8 and 9 have been shown to be mowing blades, implement heads 43a might comprise generally horizontal circular discs having depending cultivating lugs rigidly anchored thereto.

The operation of this modification of my invention need not be further described in view of the discussion of the operation of the first-described modification of my invention.

Referring now to the modification of my invention shown in Figs. 10–14, much of the structure is the same as particularly shown in Figs. 1, 2 and 3. In this modification I provide a slightly different latching arrangement and control means therefor; and this structure will be described in detail. Elements of this modification which are exactly the same or substantially the same as previously described in the description of Figs. 1–7 will be given the same numerals as used previously but will be distinguished by a prime mark. It is believed that the preceding disclosure of the structure and operation of the other modifications of my invention will suffice in many respects to act as a disclosure for this modification; and therefore, I shall specifically describe hereinafter only that which is necessary to give a thorough understanding of the features of this modification which differ from the previously described modifications of my invention.

It should be particularly noted that in this modification I have eliminated the supporting members 51 and 53 so that hub 25' of arm structure 24' adjoins the depending neck portion 49' of housing 16' and may be journalled thereon for rotation with respect thereto.

I provide a pair of latching elements 110 and 111 which are substantially L-shaped bars or rods defining radially outwardly projecting latching arm portions 112 and 113, respectively, and depending connecting portions 114, which at their lower ends are formed integrally or rigidly connected to, by welding or the like, a collar member 115 which encompasses depending neck portion 49' of housing 16' and is rigidly anchored by welding or the like to hub 25' of arm structure 24'. Latching elements 110 and 111 are disposed in diametrically opposed relationship to be circumferentially spaced 180° with latched arm portions 112 and 113 thereof normally disposed in common horizontal planes. It is clear that latching arm portions 112 and 113 project radially outwardly in opposite directions and are circumferentially spaced 180°.

Housing 16' has a laterally offset supporting platform portion 116 which is rigidly connected to and encompasses the outer end of tubular member 15' of supporting structure 10'. Bearing means comprising a normally generally vertically disposed bearing sleeve 117 is rigidly anchored, by welding or the like, to the end of platform portion 116 in laterally spaced parallel relationship to the axis of main shaft 20, see Fig. 3. A normally generally vertically disposed rock shaft 118 is journalled in bearing sleeve 117 for pivotally swinging movements with respect to housing 16' about a generally vertically disposed axis. Rock shaft 118 projects above and below the limits of platform portion 116 and has a thrust collar 119 formed therewith or rigidly anchored thereto intermediate its ends, to maintain it properly journalled. I provide a cooperating latching element 120 comprising a pair of like arms 121, see Fig. 11, rigidly connected adjacent one end of each thereof to the lower end of rock shaft 118 in normally vertically spaced parallel relationship, and a roller 122 disposed between arms 121 and connected to the free ends thereof for rotational movement about a normally generally vertically disposed axis by a pivot pin or the like. Cooperating latching element 120 projects radially outwardly from rock shaft 118 and is normally disposed in substantially common planes with latching arm portions 112 and 113. Cooperating latching element 120 is rigid with rock shaft 118 for pivotally swinging movements therewith into and out of the path of travel of arm portions 112 and 113 of latching elements 110 and 111, which are rotatable with arm structure 24', between a latched position and an unlatched position, shown in full and dotted lines in Fig. 10 respectively. Cooperating latching element 120 at its latched position is engageable with one or the other of the latching elements 110 and 111 for locking arm structure 24' against rotation at an indexed position, as will be brought out more specifically subsequently.

I provide control means which includes a lever indicated generally by the numeral 123. Lever 123 comprises a pair of spaced parallel elongated bars 124 which are journalled at adjacent ends on the upper end of rock shaft 118, one on each side of end 125 of a control arm 126. Control arm 126 is rigidly connected by welding or the like at its end 125 to the upper end of rock shaft 118. The free ends of bars 124 of lever 123 are pivotally connected to the outer end 127 of a piston 128 of any suitable piston-cylinder-type shock absorber indicated by the numeral 129. The other end of shock absorber 129, which is indicated by the numeral 130, is a part of or rigidly connected to the cylinder thereof and is pivotally connected to a supporting member 131 which is rigidly anchored by welding or the like to a pair of brace members 132. Brace members 132 at their opposite ends are rigidly anchored by welding or the like, to tubular members 14' and 15' of supporting structure 10'. Resilient means comprising a tension spring 133 is disposed in parallel relationship with shock absorber 129 and is connected at its end 134 to lever 123 adjacent the free end of one of the bars 124 and at its other end 135 is connected to the adjacent one of the bars 132 of supporting structure 10'. Resilient means or tension spring 133 biases lever 123 to the position shown in Fig. 10 which is its normal position.

I provide a connecting member between control arm 126 and lever 123 which comprises a toggle indicated by the numeral 136. Referring in particular to Fig. 14, toggle 136 comprises a pair of links 137 and 138 pivotally connected at adjacent ends by pivot pin 139 or the like. The free end 140 of link 137 is disposed between the bars 124 of lever 123 and is pivotally connected to lever 123, intermediate the ends thereof by pivot pin or bolt 141 or the like. Link 138, which may be a solid member having bifurcated opposite ends, is shown as comprising a pair of spaced parallel members. The end of toggle 136, which is the free end of link 138 is pivotally connected to the free end 142 of control arm 126 by pivot pin or bolt 143 or the like. As shown in Fig. 14, free end 142 is disposed between the spaced parallel members forming link 138. The form of lever 123 and toggle 136 herein shown disposes control arm 126, toggle 136 and lever 123 in substantially common planes even though the spaced bars 124 forming lever 123 and the spaced members forming link 138 are offset from the horizontal planes of control arm 126 and link 137 of toggle 136.

I provide a transverse stop finger rigidly connected to the spaced members of link 138, at the end thereof adjacent pivot pin 139, which engages link 137 to limit relative pivotal movements of links 137 and 138 in one direction from the fastening position of toggle 136 shown in full lines in Fig. 10. At the fastening position of toggle 136, links 137 and 138 are at dead center and in substantially straight line relationship as shown in full lines in Fig. 10. I provide yielding means comprising a tension spring 145 connected at one end to rock shaft 118, adjacent end 125 of control arm 126, and at its opposite end fastened to a buckle 146 which is disposed between the members of link 138 and rigidly anchored thereto adjacent the pivotal connection of links 137 and 138. Yielding means or tension spring 145 biases toggle 136 to the limit permitted by stop finger 144, and, thereby, to its fastening position.

At the normal position of lever 123, see Fig. 10, and at the fastening position of toggle 136, shown in full lines in Fig. 10, cooperating latching element 120 is at its latched position; whereat, roller 122 thereof is in engagement with the end of latching arm portion 113 and this locks arm structure 24' against rotation about the axis of main shaft 20, see Fig. 3. I provide operating means for moving toggle 136 from its fastening position to a released position, shown in dotted lines Fig. 10, which together with toggle 136 provides means for controllably moving control arm 126 to move cooperating latching element 120 from its latched position to its unlatched position. At the latter, cooperating latching element 120 is disposed out of the path of travel of latching arm portion 113, which will permit rotation of arm structure 24'. The aforementioned operating means comprises a manually operated lever 147, pivotally connected to supporting bar 11' of supporting structure 10' within easy reach of the tractor operator, and an elongated flexible wire or the like. Wire 148 is connected at one end of lever 147; it extends through a guide bracket 149 which is rigidly anchored to supporting bar 11'; and it is connected at its opposite end to eyelet or ring 150 which is rigidly anchored to link 138 adjacent buckle 146. It is clear that a manual movement of the end of lever 147 which is opposite thereto, away from the tractor operator, or to its dotted line position shown in Fig. 10, will be transmitted through wire 148 to move toggle 136, against the bias of tension spring 145, from its fastening position to its released position, shown in dotted lines in Fig. 10. This effects a relatively pivotal movement of links 137 and 138 from a straight line relationship to a transverse relationship which moves control arm 126 relatively toward lever 123, the latter being at its normal position. The movement of control arm 126 effects a rotation of rock shaft 118 and thereby a pivotal movement of cooperating latching element 120 to its unlatched position. When the operator releases lever 147, tension spring 145 will return toggle 136 to its fastening position, and thereby return cooperating latching element 120 to its latched position.

The operation of this modification of my invention shown in Figs. 10-14, is very similar to the operation of the other modifications of my invention, which has been described. Normally, the parts of my invention are in the positions shown in full lines in Fig. 10. Lever 123 is at its normal position, toggle 136 is at its fastening position, and cooperating latching element 120 is at its latched position. Thus, normally my agricultural implement is operated for ordinary straight running with arm structure 24' locked against rotation at an indexed position; however, implement heads 43' are rotated independently of arm structure 24', in the manner disclosed with respect to my first described modification, for mowing or cultivating, depending upon which type of implement head is used, a generally straight swath. When an obstacle, such as a tree, post or the like is disposed within the path of my agricultural implement the operator will move lever 147 from its full line position to its dotted line position just as the tree is closely approached, and prior to actual engagement of the tree with the arm structure 24'. This, as forementioned, effects the release of latched engagement between cooperating latching element 120 and latching arm portion 113 which permits the rotation of arm structure 24'. The force effected by the rotation of implement heads 23', in opposite directions, in engagement with the work rotates arm structure 24' in the direction indicated by the arrows in Fig. 10. Lever 147 is actuated only momentarily to effect the initial rotation of arm structure 24'; and upon its release, cooperating latching element 120 is returned by the force of tension spring 145 to its latched position and in position to engage latching arm portion 112 of latching element 110 in latched engagement. Latching element 110 and 111 are circumferentially spaced 180° so that arm structure 24' will rotate 180° between the indexed positions. During the rotation of arm structure 24', implement heads 43 rotate therewith 180° about the obstacle, and together cultivate or trim approximately a full 360° about the obstacle without stopping or slowing down the tractor. After one 180° cycle of rotation of arm structure 24', between two indexed positions, my agricultural implement is again ready for ordinary straight running.

After latched engagement of cooperating latching element 120 and one of the latching elements 110 and 111 has been released and arm structure 24' is rotating about the axis of main shaft 20, the stopping of such rotation by the engagement of the other of the latching elements 110 and 111 with cooperating latching element 120 would effect considerable strain upon latching element 120 without the control means I have provided. Specifically, stopping rotation of arm structure 24' puts a torque on latching element 120, tending to rotate it in the opposite direction from the direction of rotation of arm structure 24'. This torque is transmitted through rock shaft 118 to control arm 126 and through toggle 136 to lever 123 which is pivotally swingable about the axis of rock shaft 118 from its normal position, Fig. 10, toward the position thereof shown in Fig. 12. Shock absorber 129 absorbs the force of impact of one of the latching elements 110 and 111 with cooperating latching element 120 upon the pivotal swinging movement of lever 123 away from its normal position. After the impact, tension spring 133 returns lever 123 to its normal position. It is clear that even without the piston-cylinder-type shock absorber 129, tension spring 133 alone could act to some extent as a shock absorber. I provide stop means, indicated generally by the numeral 151, rigidly connected to platform portion 116 of housing 16' which limits the pivotal movements of lever 123 away from the normal position. Generally, the impact of one of the latching elements 110 and 111 with cooperating latching element 120 is not sufficient to move lever 123 to the extent that it contacts the stop means or buffer 151; however, should the impact be of such an extent, cooperating latching element 120 is moved to its unlatched position when lever 123 engages the stop means 151. This releases the latching engagement of cooperating latching element 120 and one of the latching elements 110 and 111 and prevents any damage to the structure that might be ocasioned by such an impact. In addition, should one of the implement heads 43' engage an obstacle such as a rock or the like, this will effect a load on the arm structure 24' which will be transmitted to lever 123 to pivotally swing it enough to engage the buffer or stop means 151, and thereby move cooperating latching element 120 to its unlatched position and permit the rotation of arm structure 24'. In this manner, the obstacle, which has put the load on the arm structure 24', will be avoided and damage to the structure is completely prevented. It is clear that after arm structure 24' has begun to rotate to avoid the obstacle, tension spring 133 will return lever 121 to its normal position, and cooperating latching element 120 will be returned to its latched position to again lock arm structure 24' against rotation after a 180° cycle rotation thereof.

Referring in particular to Fig. 13, I show a preferred form of stop means 151. An L-shaped bracket 152 is rigidly anchored to supporting platform portion 116 by bolts or the like extending through elongated slots 153.

In this manner, stop means or buffer 151 may be adjusted with respect to lever 123 to shorten or lengthen the pivotal swing thereof. An outwardly opening tubular member 154 extends through and is rigidly anchored to the upstanding flange of bracket 152, and it is adapted to telescopically receive a similar open ended tube member 155. A compression spring 156 is connected at its opposite ends to the oppositely disposed closed ends 157 and 158 of tube members 155 and 154, respectively. A guide sleeve 159 is rigidly anchored, by welding or the like, at one end to the upstanding flange of bracket 152 and encompasses tube members 154 and 155 adjacent the telescopic connection thereof to guide tube member 155 for longitudinal movement toward and away from the bracket 152. It is clear that the longitudinal movement of tube member 155 toward bracket 152 moves tube member 154 inwardly with respect thereto to retract the telescopic relationship of tube members 154 and 155; and this retraction is against the bias of compression spring 156. This arrangement acts as an excellent buffer to take up the shock of impact of lever 123 with stop means 151. I provide an annular flat pad 160 of rubber or the like connected to the outer closed end 157 of tube member 155.

A particular feature of this modification of my invention is the fact that supporting platform portion 116 is disposed between all of the control linkage for cooperating latching element 120 and the ground which is being worked by the implement heads 43'. This prevents any dirt, or other matter, from being thrown up from the ground into the linkage, e. g. toggle 136, lever 123 and control arm 126; and this prevents any clogging of the control mechanism of my invention and insures the proper operation thereof at all times. Platform portion 116, in effect, acts as a guard plate between the control mechanism of my invention and the ground being worked by the implement heads 43'.

Implement heads 43' as shown in this modification of my invention are the same as and operated in the same manner as implement heads 43, described in the description of the first modification of my invention; however, it is clear that this modification of my invention may be modified in the same manner that the modification shown in Figs. 8 and 9 modifies the first described modification of my invention.

My invention, including all the modifications thereof hereinshown and described, has been built and tested and found to accomplish all of the aforementioned objectives and advantages, and to be highly desirable and commercially practical as an agricultural implement. It will be obvious to those skilled in the art that my invention may be modified by many substitutions and equivalents and that this disclosure is intended to be illustrative only; therefore, I intend to be limited solely by the scope of the appended claims.

What I claim is:

1. In a rotary agricultural implement, supporting structure adapted to be connected to a tractor to be normally carried in a laterally outwardly projecting position, a normally vertically disposed shaft journalled in said supporting structure for rotation about a normally generally vertically disposed axis, arm structure including a pair of normally generally horizontally disposed interconnected aligned arms which project radially outwardly in opposite directions with respect to the axis of said shaft, means journalling said arm structure for rotation about the axis of said shaft, a pair of implement heads one being connected to each of said arms for rotational movement therewith and for rotational movement independent thereof, drive-train means connecting said shaft and each of said implement heads for rotating said heads independent of said arm structure, the independent rotation of said heads being in directions cooperating to tend to rotate said arm structure about the axis of said shaft in one direction, releasable indexing means for selectively locking said arm structure against said last mentioned rotation, and control means being actuated to permit said rotation of said arm structure about the axis of said shaft between two indexed positions.

2. The structure defined in claim 1 in which said indexing means is a spring detent mechanism comprising a pair of cooperating elements one being connected to said arm structure and the other to said supporting structure, the latter being disposed in the path of travel of the former to lock said arm structure at an indexed position, and one of said cooperating elements being selectively movable with respect to the other permitting rotational movement of said arm structure past said indexed position.

3. The structure defined in claim 1 in which said releasable indexing means comprises spring-biased detent mechanisms having cooperating latching elements connected to said arm structure and said supporting structure for selectively locking said arm structure against rotation at positions circumferentially spaced 180°.

4. The structure defined in claim 1 in which said drive-train means include a pair of normally generally horizontally disposed axially aligned shafts each being journalled in a different one of said arms for rotation with respect thereto, said generally horizontal shafts having adjacent ends connected with the lower end of said vertical shaft so that rotation of said vertical shaft in one direction drives said horizontal shafts in opposite directions.

5. The structure defined in claim 4 in which said implement heads comprise generally elongated tubular structures disposed in axially aligned relationship, each head encompassing a different one of said arms in concentric relationship with the shaft journalled therein, and means rigidly connecting each head to the shaft concentric with it for rotational movement therewith about a horizontal axis.

6. In a rotary agricultural implement, supporting structure adapted to be connected to a tractor to be normally carried in a laterally outwardly projecting position, a normally vertically disposed shaft journalled in said supporting structure for rotation about a normally generally vertically disposed axis, arm structure comprising a hub encompassing the lower part of said shaft and journalled thereon for rotation with respect thereto about the axis of said shaft and a pair of normally horizontally disposed arms anchored to said hub in radially outwardly projecting diametrically opposed relationship, a pair of vertically disposed stub shafts each connected to said arm structure for rotation therewith adjacent the free end of a different one of said arms, means journalling said stub shafts for rotation about generally vertical axes independent of said arm structure, a pair of generally horizontally disposed implement heads each anchored to a different one of said stub shafts for rotation therewith generally underlying said arm structure, drive means connecting said first-mentioned vertical shaft and each of said vertical stub shafts for rotating said implement heads in the same direction independent of said arm structure, the rotation of said heads in the same direction tending to rotate said arm structure about the axis of said shaft releasable indexing means for selectively locking said arm structure against rotation, and control means being actuated to permit rotation of said arm structure bewteen two indexed positions.

7. In a rotary agricultural implement, supporting structure adapted to be connected to a tractor to be normally carried in a laterally outwardly projecting position, a normally vertically disposed shaft journaled in said supporting structure for rotation about a normally generally vertically disposed axis, arm structure including a pair of normally generally horizontally disposed interconnected aligned arms which project radially outwardly in opposite directions with respect to the axis of said shaft, means journalling said arm structure for rotation about the axis of said shaft, a pair of implement heads one being connected to each of said arms for rotational movement therewith and for rotational movement independent thereof, drive-train means connecting said shaft and each of said implement heads for rotating said heads independent of said arm structure, the independent rotation of said heads being in directions cooperating to tend to rotate said arm structure about the axis of said shaft in one direction, releasable indexing means comprising a pair of cooperating elements one being connected to said arm structure and the other to said supporting structure, one of said elements being pivotally swingable into and out of the path of relative movement of the other between a latching position and an inoperative position, and automatic control means biasing said movable element to its latching position and being actuated by an impact force to move said movable element to its inoperative position and permit rotation of said arm structure between two indexed positions.

8. The structure defined in claim 7 in which said control means comprises a spring-biased toggle, a normally generally horizontal elongated rod pivotally connected to the same structure as said movable latching element to be disposed forwardly of said arm structure generally normal to said tractor when said latching elements are in latched relationship at an indexed position, and an actuating pin anchored to said rod in longitudinally spaced relation to the pivot axis thereof for pivotal swinging movements with said rod to engage and move said toggle.

9. The structure defined in claim 8 in which said drive-train means includes a pair of normally generally horizontally disposed axially aligned shafts each being journalled in a different one of said arms for rotation with respect thereto, and said implement heads comprise generally elongated tubular structures disposed in axially aligned relationship, each head encompassing a different one of said arms in concentric relationship with the shaft journalled therein, and means rigidly connecting each head to the shaft concentric with it for rotational movement therewith about a horizontal axis.

10. The structure defined in claim 8 in which said drive-train means comprises a pair of vertically disposed stub shafts each connected to said arm structure for rotation therewith adjacent the free end of a different one of said arms, said stub shafts being journalled for rotation about generally vertical axes independent of said arm structure, and said implement heads are generally horizontally disposed and each is anchored to a different one of said stub shafts for rotation therewith generally underlying said arm structure.

11. In a rotary agricultural implement, supporting structure adapted to be connected to a tractor and comprising a generally horizontally disposed laterally outwardly projecting tubular member and a housing at the free end of said member, a drive shaft journalled for rotation in said tubular member and adapted to be driven from the tractor take-off, a normally generally vertically disposed depending shaft journalled in said housing for rotation about a normally generally vertically disposed axis, gearing in said housing connecting said depending shaft to said drive shaft to be driven thereby, arm structure comprising a hub encompassing the lower part of said depending shaft and journalled thereon for rotation with respect thereto and a pair of normally horizontally disposed arms anchored to said hub in radially outwardly projecting diametrically opposed relationship, a pair if implement heads one being connected to each of said arms for rotational movement therewith and for rotational movement independent thereof, drive-train means connecting said shaft and each of said implement heads for rotating said heads independent of said arm structure, the independent rotation of said heads being in directions cooperating to tend to rotate said arm structure about the axis of said depending shaft in one direction, releasable indexing means comprising spring-biased detent mechanisms having cooperating latching elements connected to said arm structure and said supporting structure for selectively locking said arm structure against said rotation about the axis of said depending shaft at positions circumferentially spaced 180°, and control means being actuated to permit rotation of said arm structure about the axis of said depending shaft between two indexed positions.

12. The structure defined in claim 11 in which said releasable indexing means comprises a pair of latching elements connected to said arm structure in 180° circumferentially spaced relationship for movement therewith, said latching elements being pivotally swingable between latching positions and inoperative positions, a pair of spring-biased toggles connected to said arm structure and each being pivotally connected to a different one of said latching elements for normally maintaining said latching elements at their latching position, a cooperating latching element connected to said supporting structure and normally disposed in the path of travel of said first-mentioned pair of latching elements when the latter are in their latching positions, a pair of normally generally horizontally disposed laterally spaced parallel rods pivotally connected to said arm structure, each rod being pivotally swingable toward and away from a different one of said toggles and adapted to be disposed forwardly of said implement heads and generally normal to said tractor when the latching element pivotally connected to the toggle toward which said rod is movable is in latched relationship with the cooperating element connected to the supporting structure, and actuating pins one anchored to each of said rods in longitudinally spaced relation to the pivot axis thereof for pivotal swinging movements with said rod to engage and move the adjoining toggle whereby to release the latched relationship of one latching element and the cooperating element and permit rotation of said arm structure 180° wherein the other latching element and said cooperating element engage in latched relationship.

13. The structure defined in claim 12 in which said cooperating element connected to the supporting structure is pivotally connected thereto for swinging movements into and out of the path of travel of said pair of latching elements between a latched position and an unlatched position, in further combination with manual control means for moving said last-mentioned cooperating element.

14. In a rotary agricultural implement, supporting structure adapted to be connected to a tractor to be normally carried in a laterally outwardly projecting operative position, a normally generally vertically disposed main shaft journalled in said supporting structure for rotation about a generally vertically disposed axis and adapted to be driven from the power take-off of said tractor, arm structure including a pair of generally horizontally disposed interconnected aligned arms which project radially outwardly in opposite directions with respect to the axis of said main shaft, means journalling said arm structure for rotation about the axis of said main shaft, a pair of implement heads each being connected to a different one of said arms for rotational movement therewith and for rotational movement independent thereof, drive-train means connecting said main shaft with each of said implement heads for rotating said heads independent of said arm structure, the independent rotation of said heads being in directions cooperating to tend to rotate said arm structure in one direction about the axis of said main shaft, a pair of circumferentially spaced latching elements rigid with said arm structure and rotatable therewith about the axis of said main shaft, a rock shaft connected to said supporting structure for rotational movements with respect thereto, a cooperating latching element rigid with said rock shaft for pivotally swinging movements therewith into and out of the path of travel of said pair of latching elements between a latched position and an unlatched position, said cooperating latching element at its latched position being engageable with one of said pair of latching elements for locking said arm structure against rotation at an indexed position, and control means comprising a lever journalled adjacent one end on said rock shaft for pivotally swinging movements about the axis thereof from and back to a normal position, resilient means connected adjacent the free other end of said lever and to said supporting structure for biasing said lever to its normal position, a control arm rigid with said rock shaft, a connecting member having one end pivotally connected to said control arm and having its opposite end pivotally connected to said lever intermediate the end thereof, whereby torque applied to said cooperating latching element by a force in the same direction as the direction of rotation of said arm structure is transmitted to said control arm and through said connecting member to said lever which tends to move said lever from its normal position against the bias of said resilient means and whereby the pivotally swinging movements of said lever against the bias of said resilient means absorbs the shock of the engagement of said cooperating latching element with one of said pair of latching elements and under sufficient torque said lever will move from its normal position sufficiently to move said cooperating latching element to its unlatched position, and means for controllably moving said control arm to move said cooperating latching element between its latched and unlatched position to permit rotation of said arm structure past one indexed position.

15. The structure defined in claim 14, in which said connecting member is a toggle comprising a pair of pivotally connected links, in further combination with yielding means biasing said toggle just past dead center to a fastening position, wherein at the normal position of said lever and the fastening position of said toggle said cooperating latching element is at its latching position, and operating means connected to said toggle adjacent the pivotal connection of the links thereof for moving said toggle against the bias of said yielding means past dead center to a released position, said operating means together with said toggle comprising the aforementioned means for controllably moving said control arm to move said cooperating latching element between its latched position and its unlatched position.

16. The structure defined in claim 15, in which said pair of latching elements are circumferentially spaced 180°.

17. The structure defined in claim 16, in further combination with a piston-cylinder-type shock absorber disposed in parallel with said resilient means and having one end connected to said supporting structure and the other end connected to the free end of said lever.

18. In a rotary agricultural implement, supporting structure adapted to be connected to a tractor to be normally carried in a laterally outwardly projecting operative position; a normally generally vertically disposed main shaft journalled in said supporting structure for rotation about a generally vertically disposed axis and adapted to be driven from the power take-off of said tractor; arm structure including a pair of normally generally horizontally disposed inter-connected aligned arms which project radially outwardly in opposite directions with respect to the axis of said shaft; means journalling said arm structure for rotation about the axis of said main shaft; a pair of implement heads each being connected to a different one of said arms for rotational movement therewith and for rotational movement independent thereof; drive-train means connecting said main shaft with each of said implement heads for rotating said heads independent of said arm structure, the independent rotation of said heads being in directions cooperating to tend to rotate said arm structure in one direction about the axis of said main shaft; a pair of latching elements disposed in 180° circumferentially spaced relationship with each other and each being rigid with said arm structure and rotatable therewith about the axis of said main shaft; a normally generally vertically disposed rock shaft connected to said supporting structure in laterally spaced parallel relation to the axis of said main shaft for rotational movements with respect to said supporting structure about a normally generally vertically disposed axis; a cooperating latching element rigidly connected to the lower end of said rock shaft and projecting radially outwardly therefrom, said cooperating latching element being pivotally swingable with said rock shaft into and out of the path of travel of said pair of latching elements between a latched position and an unlatched position wherein at the former said cooperating latching element is engageable with one of said pair of latching elements for selectively locking said arm structure against rotation at an indexed position and at the latter said arm structure is free to rotate about the axis of said main shaft; and control means comprising a normally generally horizontally disposed lever having one end journalled on said rock shaft adjacent the upper end thereof for pivotally swinging movements about the axis of said rock shaft from and back to a normal position, resilient means connected adjacent the free other end of said lever and to said supporting structure for biasing said lever to its normal position, stop means rigidly connected to said supporting structure limiting the pivotal movements of said lever away from its normal position, a control arm rigidly connected to said rock shaft adjacent the upper end thereof transversely disposed with respect to said cooperating latching element and disposed in substantially common planes with said lever, a normally generally horizontally disposed toggle adjoining said control arm and said lever in substantially common planes and comprising a pair of links having adjacent ends pivotally connected and being pivotally connected at the free end of one of said links to the free end of said control arm and pivotally connected at the free end of the other link to said lever intermediate the ends thereof, yielding means biasing said toggle just past dead center to a fastening position at which position said control arm and said toggle and one end portion of said lever form substantially a triangle whereby torque applied to said cooperating latching element by a force in the same direction as the direction of rotation of said arm structure is transmitted to said control arm and through said toggle to said lever which tends to move said lever from its normal position against the bias of said resilient means toward said stop means and whereby the pivotally swinging movements of said lever against the bias of said resilient means absorbs the shock of the engagement of said cooperating latching element with one of said pair of latching elements and under sufficient torque said lever will move from its normal position sufficiently to engage said stop means at which position said cooperating latching element is moved to its unlatched position, and operating means connected to said toggle adjacent the pivotal connection of the links thereof for moving said toggle against the bias of said yielding means past dead center to a released position for controllably moving said control arm from its latched position to its unlatched position to permit rotation of said arm structure past one indexed position, whereby upon release of said operating means said yielding means returns said toggle to its fastening position which moves said cooperating latching element to a latching position to be engaged by the other of said pair of latching elements.

19. In a rotary agricultural implement, supporting structure adapted to be connected to a tractor and comprising a generally horizontally disposed laterally outwardly projecting tubular member and a housing at the free end of said member; a drive shaft journalled for rotation in said tubular member and adapted to be driven from the power take-off of said tractor; a normally generally vertically disposed depending main shaft journalled in said housing adjacent its upper end for rotation about a normally generally vertically disposed axis; gearing in said housing connectng said depending main shaft to said drive shaft to be driven thereby; arm structure comprising a hub encompassing the lower part of said depending main shaft and journalled thereon for rotation with respect thereto and a pair of normally horizontally disposed arms rigidly anchored to said hub in radially outwardly projecting diametrically opposed relationship; a pair of implement heads each being connected to a different one of said arms for rotational movement therewith and for rotational movement independent thereof; drive-train means connecting said main shaft and each of said implement heads for rotating said heads independent of said arm structure, the independent rotation of said heads being in directions cooperating to tend to rotate said arm structure in one direction about the axis of said main shaft; said housing having a laterally offset supporting platform portion; a normally generally vertically disposed rock shaft projecting above and below the offset platform portion of said housing in laterally spaced parallel relationship to the axis of said main shaft; bearing means connecting said rock shaft to said platform portion for rotational movements about a normally generally vertically disposed axis; a pair of latching elements rigidly anchored to said arm structure and rotatable therewith about the axis of said main shaft each having a latching arm portion projecting radially outwardly which are disposed in 180° circumferentially spaced relationship with respect to each other; a cooperating latching element rigidly connected to the lower end of said rock shaft and projecting radially outwardly therefrom and disposed in substantially common planes with said latching arm portions, said cooperating latching element being pivotally swingable with said rock shaft into and out of the path of travel of said pair of latching elements between a latching position and an unlatched position wherein at the former said cooperating latching element is engageable with one of said latching arm portions for selectively locking said arm structure against rotation at an indexed position and at the latter said arm structure is free to rotate about the axis of said main shaft; and control means comprising a normally generally horizontally disposed lever overlying said supporting platform portion and having one end journalled on said rock shaft at the upper end thereof for pivotally swinging movements about the axis of said rock shaft from and back to a normal position, resilient means connected adjacent the free other end of said lever and to said supporting structure for biasing said lever to its normal position, stop means rigidly connected to said supporting structure limiting the pivotal movements of said lever away from its normal position, a control arm rigidly connected to said rock shaft adjacent the upper end thereof transversely disposed with respect to said cooperating latching element and disposed in substantially common planes with said lever, a normally generally horizontally disposed toggle adjoining said control arm and said lever in substantially common planes and comprising a pair of links having adjacent ends pivotally connected and being pivotally connected at the free end of one of said links to the free end of said control arm and pivotally connected at the free end of the other link to said lever intermediate the ends thereof, yielding means biasing said toggle just past dead center to a fastening position at which position said control arm and said toggle and one end portion of said lever form substantially a triangle whereby torque applied to said cooperating latching element by a force in the same direction as the direction of rotation of said arm structure is transmitted to said control arm and through said toggle to said lever which tends to move said lever from its normal position against the bias of said resilient means toward said stop means and whereby the pivotally swinging movements of said lever against the bias of said resilient means absorbs the shock of the engagement of said cooperating latching element with one of said pair of latching elements and under sufficient torque said lever will move from its normal position sufficiently to engage said stop means at which position said cooperating latching element is moved to its unlatched position, and operating means connected to said toggle adjacent the pivotal connection of the links thereof for moving said toggle against the bias of said yielding means past dead center to a released position for controllably moving said control arm from its latched position to its unlatched position to permit rotation of said arm structure past one indexed position, whereby upon release of said operating means said yielding means returns said toggle to its fastening position which moves said cooperating latching element to its latching position to be engaged by the other of said pair of latching elements.

20. The structure defined in claim 19 in further combination with a piston-cylinder-type shock absorber disposed in parallel with said resilient means and having one end connected to said supporting structure and the other end connected to said free other end of said lever.

References Cited in the file of this patent

UNITED STATES PATENTS

| | | |
|---|---|---|
| 2,421,558 | Goldsmith | June 3, 1947 |
| 2,668,488 | Shimmon | Feb. 9, 1954 |
| 2,732,675 | Smith et al. | Jan. 1, 1956 |